(12) United States Patent
Ding et al.

(10) Patent No.: US 10,302,394 B2
(45) Date of Patent: May 28, 2019

(54) TURRET LOCKING MECHANISM FOR OPTICAL DEVICE

(71) Applicant: Leapers, Inc., Livonia, MI (US)

(72) Inventors: Tai-Lai Ding, Northville, MI (US); Xuezhe Wang, Northville, MI (US); Zhuhao Jin, New Hudson, MI (US)

(73) Assignee: Leapers, Inc., Livonia, MI (US)

( * ) Notice: Subject to any disclaimer, the term of this patent is extended or adjusted under 35 U.S.C. 154(b) by 232 days.

(21) Appl. No.: 15/395,402

(22) Filed: Dec. 30, 2016

(65) Prior Publication Data
US 2017/0199009 A1    Jul. 13, 2017

Related U.S. Application Data

(60) Provisional application No. 62/278,273, filed on Jan. 13, 2016.

(51) Int. Cl.
*F41G 1/38*    (2006.01)
*G02B 27/36*    (2006.01)

(52) U.S. Cl.
CPC .............. *F41G 1/38* (2013.01); *G02B 27/36* (2013.01)

(58) Field of Classification Search
CPC ........... F41G 1/38; F41G 11/00; G02B 23/16; G05G 5/12
USPC ............. 33/298; 42/122, 119, 130; 356/252; 359/428
See application file for complete search history.

(56) References Cited

U.S. PATENT DOCUMENTS

| 4,466,709 A | * | 8/1984 | Osawa | G02B 7/10 359/699 |
| 5,653,605 A | * | 8/1997 | Woehl | H01R 13/622 439/321 |
| 7,997,163 B2 | | 8/2011 | Casas | |
| 8,312,667 B2 | | 11/2012 | Thomas et al. | |
| 8,479,402 B2 | | 7/2013 | Schmitt | |
| 8,516,736 B2 | | 8/2013 | Windauer | |
| 8,904,696 B2 | | 12/2014 | Geller | |
| 8,984,796 B2 | | 3/2015 | Thomas et al. | |

(Continued)

FOREIGN PATENT DOCUMENTS

DE    202014000102 U1    2/2014

OTHER PUBLICATIONS

European Search Report for Application No. 17151372.4 dated Jun. 16, 2017.

*Primary Examiner* — Christopher W Fulton
(74) *Attorney, Agent, or Firm* — Honigman LLP

(57) ABSTRACT

An apparatus includes an adjustment knob, an inner locking ring, and an outer locking ring threadably coupled to the inner locking ring. The adjustment knob includes at least one tooth protruding radially inward from an inner peripheral edge of the adjustment knob. The inner locking ring includes at least one tooth protruding radially outward from the inner locking ring and configured to engage the at least one tooth of the adjustment knob to prevent rotational movement of the adjustment knob. The outer locking ring is configured to move the inner locking ring in a first axial direction toward the adjustment knob when the outer locking ring is rotated in a first rotatable direction. The outer locking ring is also configured to move the inner locking ring in an opposite second axial direction away from the adjustment knob when the outer locking ring is rotated in an opposite second rotatable direction.

19 Claims, 5 Drawing Sheets

(56) References Cited

U.S. PATENT DOCUMENTS

| | | | |
|---|---|---|---|
| 2012/0167444 A1* | 7/2012 | Adkins | F41G 1/38 42/135 |
| 2013/0276345 A1* | 10/2013 | Hamilton | F41G 1/38 42/119 |
| 2013/0312310 A1 | 11/2013 | Geller | |
| 2014/0196351 A1* | 7/2014 | Campean | G05G 1/082 42/119 |
| 2016/0169672 A1* | 6/2016 | Ottl | F41G 1/38 356/247 |
| 2017/0328674 A1* | 11/2017 | VanBecelaere | F41G 1/38 |
| 2018/0292171 A1* | 10/2018 | Hamilton | F41G 1/38 |

* cited by examiner

TURRET LOCKING MECHANISM FOR OPTICAL DEVICE

CROSS-REFERENCE TO RELATED APPLICATIONS

This U.S. Patent Application claims priority to U.S. Provisional Application 62/278,273 filed on Jan. 13, 2016, the disclosure of which is considered part of the disclosure of this application and is hereby incorporated by reference in its entirety.

TECHNICAL FIELD

This disclosure relates to optical devices having an adjustable reticle, and more particularly to an optical device having a reticle locking mechanism for preventing adjustment of the reticle.

BACKGROUND

Sighting devices, such as rifle scopes, are typically equipped with one or more adjustment mechanisms that allow a shooter to change a setting of a reticle for aiming at a specific target. The adjustment mechanisms may change adjustment of, for example, elevation, windage (e.g., cross-range), or parallax of the sighting device. Adjustment mechanisms typically include an adjustment knob that may be rotated when a change to the setting of the reticle is desired. A cover cap may be employed to prevent unintentional rotation by the adjustment knob after adjusting the reticle to a desired setting. The cover cap may be removed each time the shooter wants to adjust the setting of the reticle. In addition to creating a potential for loss of the cover cap, removing the cover cap for each adjustment can be time consuming when a shooter wants to quickly change the reticle setting. Some adjustment mechanisms may require that the knob be raised to permit rotation by the adjustment knob, and lowered to prevent rotation of the adjustment knob due to friction between two or more components. However, such raising and lowering of the adjustment knob reduces the lifespan and reliability of the adjustment mechanism over time.

SUMMARY

An apparatus for adjusting and locking a reticle of an optical device. The apparatus includes an adjustment knob, an inner locking ring, and an outer locking ring threadably coupled to the inner locking ring. The adjustment knob includes at least one tooth protruding radially inward from an inner peripheral edge of the adjustment knob. The inner locking ring includes at least one tooth protruding radially outward from the inner locking ring and configured to engage the at least one tooth of the adjustment knob to prevent rotational movement of the adjustment knob. The outer locking ring is configured to move the inner locking ring in a first axial direction toward the adjustment knob when the outer locking ring is rotated in a first rotatable direction. The outer locking ring is also configured to move the inner locking ring in an opposite second axial direction away from the adjustment knob when the outer locking ring is rotated in an opposite second rotatable direction.

Implementations of the disclosure may include one or more of the following optional features. In some implementations, the at least one tooth of the adjustment knob includes a plurality of teeth formed from the inner peripheral edge and circumferentially extending around the inner peripheral edge of the adjustment knob. Moreover, the at least one tooth of the inner threaded locking ring may axially moves into engagement with the at least one tooth of the adjustment knob when the inner threaded locking ring moves in the first axial direction. On the other hand, the at least one tooth of the inner threaded locking ring may be configured to disengage from the at least one tooth of the adjustable knob when the inner threaded locking ring axially moves in the second axial direction.

In some examples, the inner threaded locking ring defines an axial slot configured to guide the axial movement of the inner threaded locking ring along the first and second axial directions. Additionally, the axially slot may prevent rotational movement by the inner threaded locking ring when the outer locking ring is rotated.

The apparatus may also include a turret adjustment base enclosed within the adjustment knob. The turret adjustment base may be releasably coupled for common rotation with the adjustment knob. In some examples, the adjustment knob defines a sidewall axially extending between an open end and a closed end, and includes one or more apertures formed through the sidewall. In these examples, each aperture is configured to receive a corresponding set screw for releasably coupling the turret adjustment base for common rotation with the adjustment knob. In some configurations, the adjustment knob includes at least three apertures formed through the sidewall.

In some implementations, the apparatus further includes a turret base defining a threaded axial passage threadably engaged to a reticle adjustment screw. The reticle adjustment screw is coupled for common rotation with the turret base, and the turret adjustment base is configured to rotate relative to the turret base to cause axial movement by the turret adjustment screw. The apparatus may also include a turret guide pin coupled for common rotation with the turret adjustment base. The turret guide pin may be biased into engagement with a ratcheted surface of the turret base that encloses the turret adjustment base.

Another aspect of the disclosure provides apparatus for adjusting and locking a reticle of an optical device. The apparatus includes an adjustment knob, an inner locking ring, and an outer locking ring threadably coupled to the inner locking ring. The adjustment knob has a plurality of teeth circumferentially extending around an inner peripheral edge of the adjustment knob. The inner threaded locking ring has at least one tooth and a threaded outer portion. The at least one tooth protrudes radially outward from the inner threaded locking ring and is configured to selectively engage one or more of the teeth of the adjustment knob to prevent rotational movement of the adjustment knob. The outer locking ring is configured to axially move the at least one tooth of the inner threaded locking ring into engagement with the one or more teeth of the adjustment knob when rotated in a locking direction.

This aspect may include one or more of the following optional features. In some implementations, the outer locking ring is further configured to axially move the at least one tooth of the inner threaded locking ring out of engagement with the one or more teeth of the adjustment knob when rotated in an unlocking direction. The outer locking ring may move the inner threaded locking ring in a first axial direction toward the adjustment knob when the outer locking ring is rotated in the locking direction, and may move the inner threaded locking ring in an opposite second axial direction away from the adjustment knob when the outer locking ring is rotated in an unlocking direction. In some examples, the inner threaded locking ring defines an axial slot configured to guide the axial movement of the inner threaded locking ring along the first and second axial directions but prevent rotational movement of the inner threaded locking ring.

Another aspect of the disclosure provides a method for adjusting and locking a reticle of an optical device. The method includes threadably coupling an outer locking ring to an inner locking ring. The inner locking ring has at least one tooth and a threaded outer portion. The method also includes rotating the outer locking ring in a first rotatable direction to move the inner threaded locking ring in a first axial direction toward an adjustment knob. The adjustment knob has an inner peripheral edge and at least one tooth formed on the inner peripheral edge. The at least one tooth formed on the inner peripheral edge is configured to engage the at least one tooth of the inner locking ring when outer locking ring rotates in the first rotatable direction. The method also includes rotating the outer locking ring in a second rotatable direction to move the inner threaded locking ring in an opposite second axial direction away from the adjustment knob.

This aspect may include one or more of the following optional features. In some examples, the at least one tooth of the adjustment knob protrudes radially inward from the inner peripheral edge of the adjustment knob, and the at least one tooth of the inner locking ring protrudes radially outward from the inner threaded locking ring. Rotational movement by the adjustment knob may be prevented when the at least one tooth of the inner locking ring engages the at least one tooth formed on the inner peripheral edge of the adjustment knob.

In some implementations, the axial movement by the inner threaded locking ring in the second axial direction disengage the at least one tooth of the inner locking ring from the at least one tooth formed on the inner peripheral edge. Rotational movement by the adjustment knob may be allowed when the at least one tooth of the inner locking ring and the at least one tooth formed on the inner peripheral edge of the adjustment knob are disengaged.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
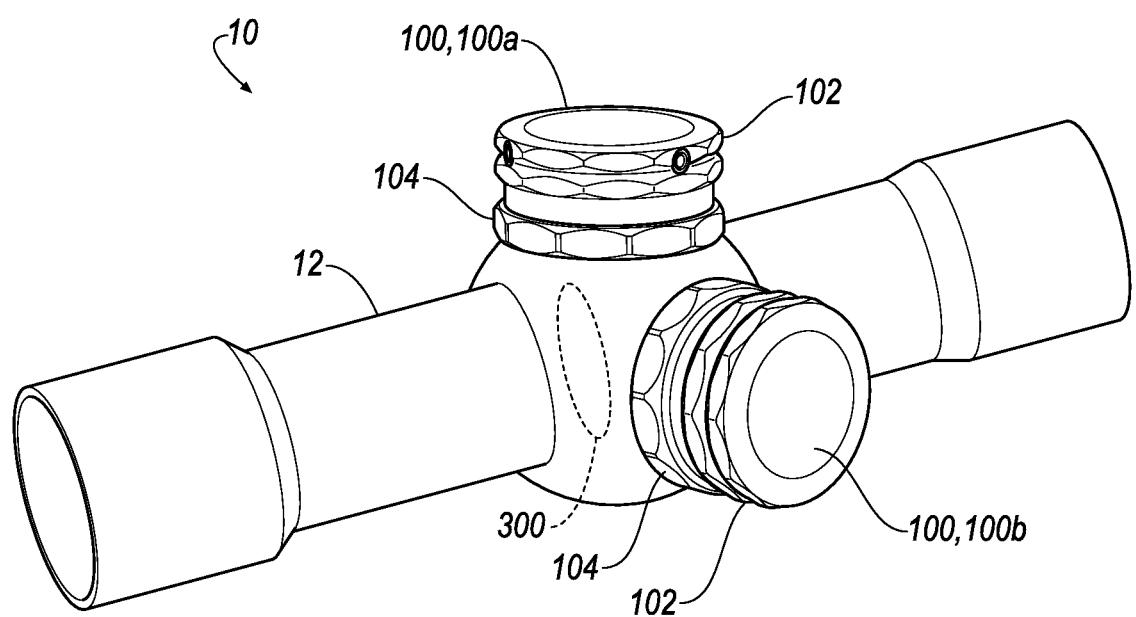
FIG. 1 is a perspective view of an example optical device having a pair of adjustment mechanisms for adjusting a setting of a reticle.

Referring to FIG. 1, in some implementations, an optical device 10 configured to mount onto a shooting device includes a pair of adjustment mechanisms 100, 100a-b for adjusting a setting of a reticle 300 of the optical device 10. The optical device 10 may include a sighting device, such as a telescopic scope, for use in aiming the shooting device at a specific target. One of the adjustment mechanisms 100a, 100b may adjust an elevation setting of the reticle 300 of the optical device 10, while the other adjustment mechanism 100a, 100b may adjust a windage setting of the reticle of the optical device 10. At least one of the adjustment mechanisms 100a, 100b may be configured to adjust settings other than windage or elevation. The adjustment mechanisms 100 may be mounted on a main tube 12 of the optical device 10 and include an adjustment knob 102 that may be rotated relative to the main tube 12 to adjust the corresponding setting (e.g., windage or elevation) of the reticle 300 located within the main tube 12. In some configurations, the reticle 300 is not attached directly to adjustment pin 116 but rather it is attached indirectly to adjustment pin 116 by way of one or more intermediate members. One such member could be an inner tube enclosed within the main tube 12. In such an arrangement where an inner tube is used, the inner tube is connected to adjusting pin by way of one or more linkage mechanisms and the reticle is attached to the inner tube. The adjustment mechanisms 100 also include an outer locking ring 104 configured to lock rotation by the adjustment knob 102 when rotated relative to the main tube 12 and the adjustment knob 102 in a locking direction (i.e., one of clockwise or counterclockwise). The outer locking ring 104 is also configured to permit rotation by the adjustment knob 102 when rotated relative to the main tube 12 and the adjustment knob 102 in an opposite unlocking direction (i.e., the other one of clockwise or counterclockwise).

Figure 2A:
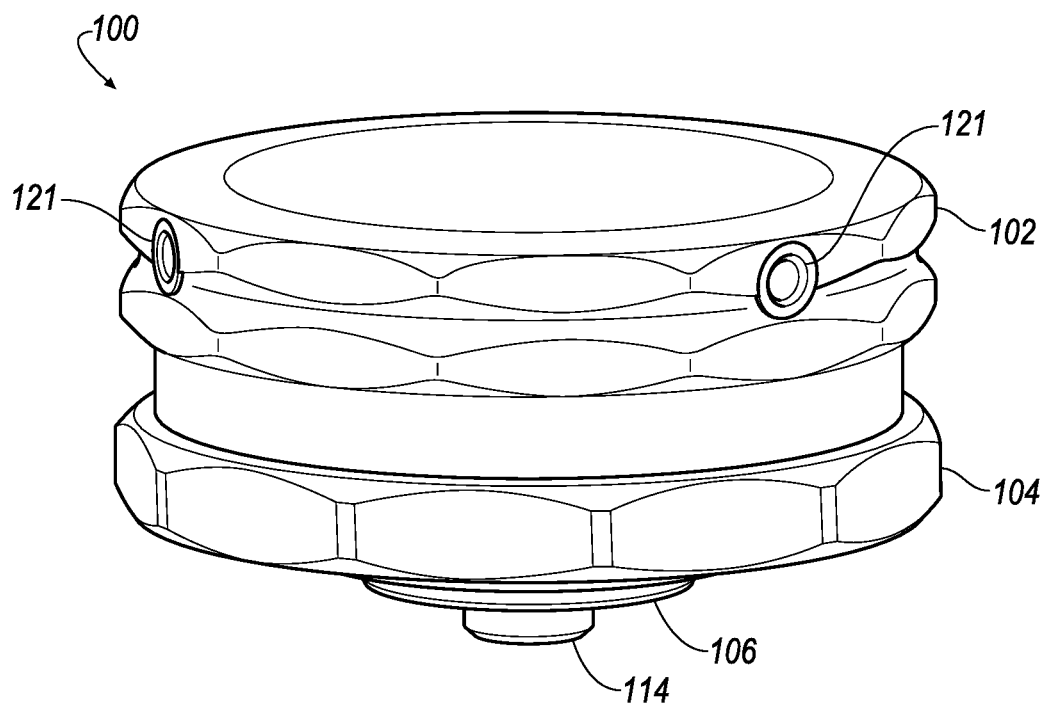
FIGS. 2A and 2B are top (FIG. 2A) and bottom (FIG. 2B) perspective views of one of the adjustment mechanisms of the shooting scope of FIG. 1.
Figure 2B:
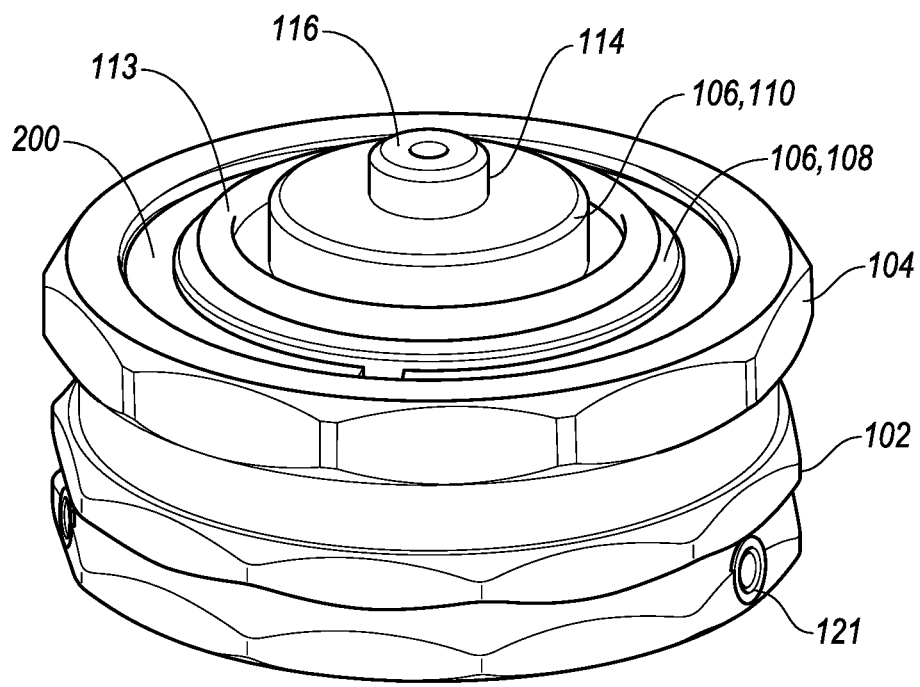

FIGS. 2A and 2B show top (FIG. 2A) and bottom (FIG. 2B) perspective views of the adjustment mechanism 100 for use in adjusting the reticle 300 of the optical device 10 of FIG. 1. The examples show the adjustment mechanism 100 including the adjustment knob 102, the outer locking ring 104, and a turret base 106 coaxial to the adjustment knob 102 and the outer locking ring 104. The turret base 106 includes a bottom surface 108 and a protruded portion 110 axially extending from the bottom surface 108. In some examples, the bottom surface 108 opposes an outer surface of the main tube 12 and the protruded portion 110 is configured to extend into the main tube 12 through a slot formed through the outer surface of the tube 12. A sealing ring 113 may be disposed between the bottom surface 108 of the turret base 106 and the outer surface of the main tube 12 when the turret base 106 is disposed upon the main tube 10. The protruded portion 110 of the turret base 106 defines a threaded axial passage 112 (FIG. 3) configured to receive an adjustment screw 114 having threads 115 (FIG. 3) configured to threadably couple to the threaded axial passage 112.

The adjustment screw 114 axially extends into the main tube 12 and may retain an adjustment pin 116 that mechanically couples with the reticle 300 disposed within the main tube 12 of the optical device 10. In some configurations, the adjustment pin 116 mechanically engages with an inner tube within the main tube 12 that is fixedly attached to the reticle 300. In some examples, the adjustment screw 114 retains the adjustment pin 116 via an interference fit. In other configurations, the adjustment screw 114 corresponds to a spade screw having a spaded portion in lieu of the adjustment pin 116 for mechanically engaging with the inner tube fixedly attached to the reticle 300, or directly with the reticle 300. When the adjustment mechanism 100 is in an unlocked state, rotation by the adjustment knob 102 causes the adjustment screw 114 and the adjustment pin 116 to axially move relative to the turret base 106 (e.g., by threadably traversing the threaded axial passage 112). Accordingly, the axial movement by the adjustment screw 114 results in an adjustment to the setting of the reticle 300 mechanically coupled thereto.

The outer locking ring 104 is axially spaced apart from the adjustment knob 102 and circumscribes a portion of the turret base 106. The outer locking ring 104 is configured to rotate relative to the turret base 106 in a locking direction to move the adjustment mechanism 100 into the locked state, and thereby prevent rotation of the adjustment knob 102. Specifically, an inner threaded locking ring 200 fits inside, and threadably couples to, the outer locking ring 104 and axially moves into engagement with the adjustment knob 102 to prevent rotation thereof when the outer locking ring 104 is rotated in the locking direction. As used herein, the engagement between the inner threaded locking ring 200 and the adjustment knob 102 corresponds to at least one tooth 210 (FIG. 3) associated with the inner threaded locking ring 200 engaging with at least one tooth 212 (FIG. 3) associated with the adjustment knob 102. Accordingly, the adjustment knob 102 is never prevented from rotating due to friction with another component, such as a rubber sleeve. On the other hand, rotating the outer locking ring 104 in an opposite unlocking direction moves the adjustment mechanism 100 to the unlocked state, thereby allowing the adjustment knob 102 to rotate freely for adjusting the setting of the reticle 300. Here, rotation of the outer locking ring 104 in the unlocking direction causes the inner threaded locking ring 200 to axially move out of engagement with the adjustment knob 102 to allow rotation thereof. The examples also show one or more set screws 121 extending through the adjustment knob 102 to couple the adjustment knob 102 to a turret adjustment base 120 (FIG. 3) enclosed within the adjustment knob 104. Rotation by the adjustment knob 102 may cause the turret adjustment base 120 to drive the adjustment screw 114 for changing the setting of the reticle 300. In some configurations, the reticle 300 is fixed to an inner tube enclosed within the main tube 12 of the optical device 10 and the adjustment screw 114 drives the inner tube such that movement by the inner tube when driven by the adjustment screw 114 causes corresponding movement by the reticle 300. The coupling between the adjustment knob 102 and the turret adjustment base 120 by the one or more set screws 121 is described in greater detail below with reference to FIG. 3.

Figure 3:
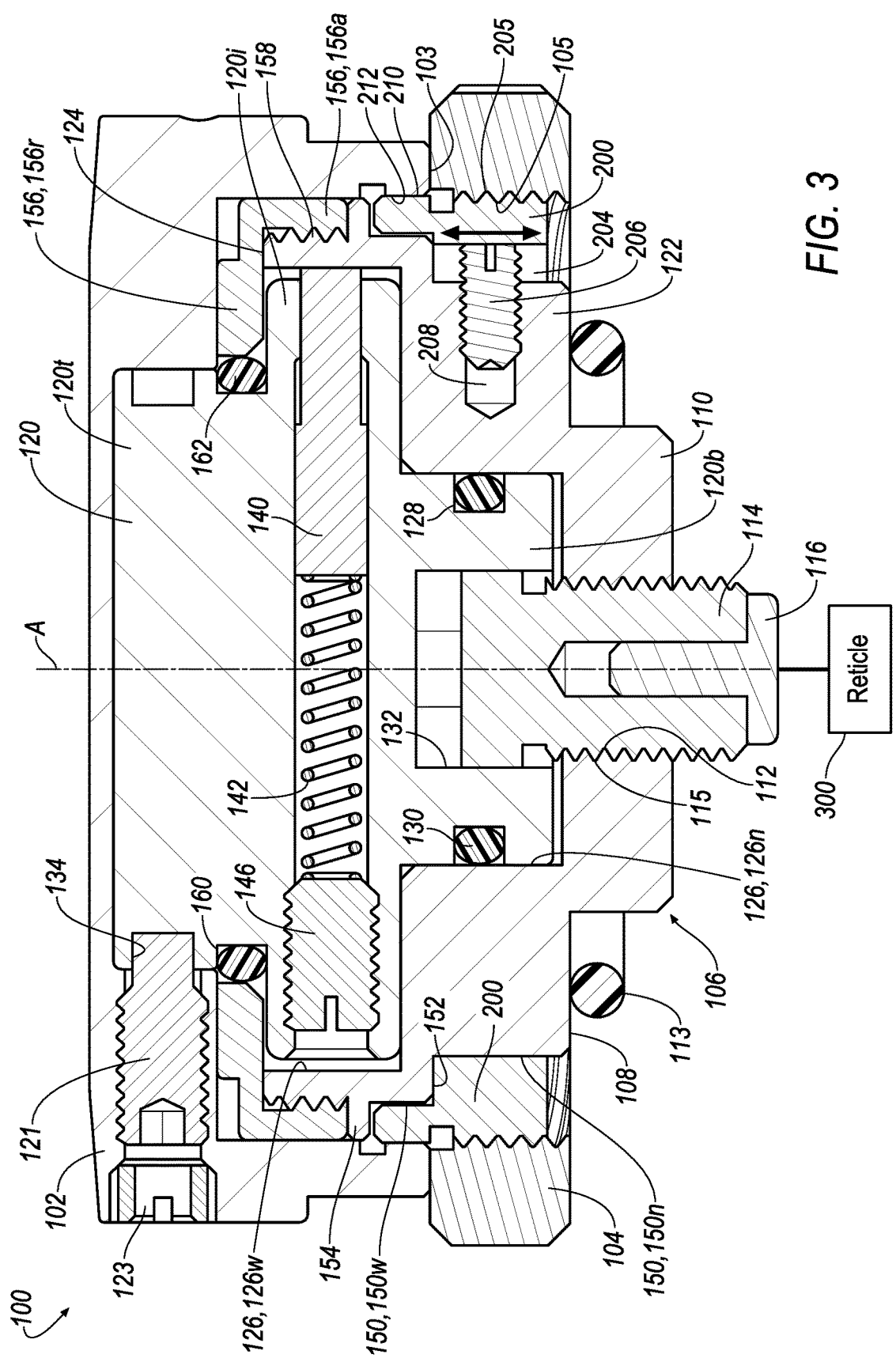
FIG. 3 is a schematic cross-sectional view of the adjustment mechanism of FIGS. 2A and 2B.

FIG. 3 provides a schematic cross-sectional view of the adjustment mechanism 100 of FIGS. 1-2B in a locked state. The adjustment mechanism 100 includes the adjustment knob 102, the outer locking ring 104, the turret base 106, the turret adjustment screw 114, the adjustment pin 116, the turret adjustment base 120, and the inner threaded locking ring 200. The adjustment knob 102 may include an open end 103 that opposes the outer locking ring 104 and configured to provide access to a cavity for receiving portions of the turret base 106 and the turret adjustment base 120.

In some implementations, the turret base 106 fixedly attaches to the main body 12 of the optical device 10 (e.g., telescopic sight) of FIG. 1. In the example shown, the turret base 106 includes a body portion 122 extending between the bottom surface 108 and a top surface 124, and the protruding portion 110 extending from the bottom surface 108 of the body portion 122 in an axial direction away from the top surface 124. The sealing ring 113 may surround the protruding portion 110 and rest between the bottom surface 108 of the turret base 106 and the main body 12 of the optical device 10 when the adjustment mechanism 100 mounts on the main body 12.

The body portion 122 includes a circumferential interior wall 126 axially extending from the protruding portion 110 to the top surface 124 and circumscribing a cavity configured to receive at least a portion of the turret adjustment base 120. The turret adjustment base 120 includes a bottom cylindrical region 120$b$, a top cylindrical region 120$t$, and an intermediate cylindrical region 120$i$ disposed between the bottom and top cylindrical regions 120$b$, 120$t$.

The interior wall 126 may include a wide section 126$w$ proximate to the top surface 124 of the turret base 106 and configured to enclose the intermediate cylindrical region 120$i$ of the turret adjustment base 120. Thus, the wide section 126$w$ of the interior wall 126 includes a diameter greater than a diameter of an outer peripheral edge of the intermediate cylindrical region 120$i$ of the turret adjustment base 120. The interior wall 126 may also include a narrow section 126$n$ axially extending between the wide section 126$w$ and the protruded portion 110 of the turret base 106 and having a smaller diameter than the wide section 126$w$. The narrow section 126$n$ is configured to enclose the bottom cylindrical region 120$b$ of the turret adjustment base 120, and therefore includes a diameter greater than a diameter of an outer peripheral edge of the bottom cylindrical region 120$b$. In the example shown, a circumferential groove 128 formed in the outer peripheral edge of the bottom cylindrical region 120$b$ of the turret adjustment base 120 receives a sealing ring 130 configured to slightly compress between the narrow section 126$n$ of the interior wall 126 and the bottom cylindrical region 120$b$ of the turret adjustment base 120. Here, the sealing ring 130 provides an interference fit between the turret adjustment base 120 and the turret base 106 when the bottom cylindrical region 120$b$ is inserted into the cavity defined by the narrow section 126$n$ of the turret base 106.

In some implementations, the bottom cylindrical region 120$b$ defines a central axial recess 132 coaxial with the axial threaded passage 112 of the protruded portion 110 and configured to accommodate axial movement by the adjustment screw 114 when the adjustment screw 114 threads into and out of the threaded axial passage 112. Here, the adjustment screw 114 may be coupled for common rotation with the turret adjustment base 120 such that rotation by the turret adjustment base 120 causes the adjustment screw 114 to axially traverse the axial threaded passage 112.

The adjustment knob 102 may enclose the top cylindrical region 120$t$ and the intermediate cylindrical region 120$i$ of the turret adjustment base 120. The at least one set screw 121 may extend through an aperture 164 (FIG. 4) formed through the adjustment knob 102 and into a circumferential slot 134 formed in an outer peripheral edge of the top cylindrical region 120$t$ of the turret adjustment base 120 to couple the adjustment knob 102 and the turret adjustment base 120 for common rotation about the axis A. A corresponding screw cap 123 may manipulate each set screw 121 to couple and decouple the adjustment knob 102 to and from the turret adjustment base 120. For instance, it may be desirable to decouple the adjustment knob 102 from the turret adjustment base 120 to zero a dial on the adjustment knob after adjusting the reticle 300 to a desired setting.

In some implementations, the turret adjustment base 120 is configured with a click detent, which is formed by a turret guide pin 140 and an adjustment spring 142 within a passage defined by the intermediate cylindrical region 120*i* of the turret adjustment base 120. The wide section 126*w* of the internal wall 126 of the adjustment base 106 defines a ratcheted surface having a plurality of teeth arranged along the inner periphery of the wide section 126*w* and protruding radially inward toward the outer peripheral edge of the intermediate cylindrical region 120*i* of the turret adjustment base 120. Here, the turret guide pin 140 is preloaded by the adjustment spring 142 and configured to engage with the teeth of the wide section 126*w* to provide a "click" indicating an incremental change of position of the turret adjustment base 120 (and adjustment screw 114 fixedly attached thereto) during each successive engagement between the teeth of the wide section 126*w* and the turret guide pin 140. The adjustment spring 142 may be preloaded against a corresponding screw 146 configured to enclose the spring 142 within the passage defined by the intermediate cylindrical region 120*i* of the turret adjustment base 120.

The body portion 122 of the turret base 106 also includes a circumferential outer wall 150 axially extending from the bottom surface 108 to the top surface 124. In the example shown, the outer wall 150 includes a wide section 150*w* proximate to the top surface 124 of the turret base 106 that opposes an inner peripheral wall of the adjustment knob 102, and a narrow section 150*n* axially extending between the wide section 150*w* and the bottom surface 108 of the turret base 106 and having a smaller diameter than the wide section 150*w*. The outer locking ring 104 circumscribes the narrow section 150*n* of the outer wall 150 and therefore includes a diameter greater than the diameter of the narrow section 150*n* (and also the diameter of the wide section 150*w*). A radial shoulder 152 interconnects the narrow section 150*n* and the wide section 150*w*.

In some examples, a radial lip 154 extends radially outward from the wide section 150*w* of the outer wall 150 to segment the wide section 150*w* into first and second axial segments. The first axial segment of the wide section 150*w* axially extends between the radial shoulder 152 and the radial lip 154, and the second axial segment of the wide section 150*w* axially extends between the radial lip 154 and the top surface 124 of the turret base 106.

In some implementations, a turret base locking ring 156 fits inside the adjustment knob 102 and around the second axial segment of the wide section 150*w* to allow the adjustment knob 102 to releasably fasten with the turret base 106 and allow the turret adjustment base 120 to rotate relative to the turret base 106 about the axis A. Specifically, the turret base locking ring 156 includes an axial portion 156*a* seated upon the radial lip 154 of the turret base 106 and having internal threads that mate with corresponding outer threads 158 along the second axial segment of the wide section 150*w* of the turret base 106. An outer periphery of the axial portion 156*a* abuts the inner periphery of the adjustment knob 102. In the example shown, the turret base locking ring 156 also includes a radial portion 156*r* extending radially inward from the axial portion 156*a*. The radial portion 156*r* may be disposed axially between the adjustment knob 102 and the top surface 124 of the turret base 106 and a portion of the intermediate cylindrical region 120*i* of the turret adjustment base 120. A circumferential groove 160 may be formed at an intersection between the top cylindrical region 120*i* and the intermediate cylindrical region 120*i* of the turret adjustment base 120. The groove 160 may accommodate a sealing ring 162 disposed between the radial portion 156*r* of the turret base locking ring 156 and the top cylindrical region 120*i* of the turret adjustment base 120.

The inner threaded locking ring 200 is configured to fit within a radial gap between the adjustment knob 102 and the wide section 150*w* of the turret base 106, and within another radial gap between the outer locking ring 104 and the narrow section 150*n* of the turret base 106. The inner threaded locking ring 200 includes an outer thread portion 205 configured to mate with corresponding inner threads 105 of the outer locking ring 104 to threadably couple the inner threaded locking ring 200 to the outer locking ring 104. The inner threaded locking ring 200 is configured to move axially when the outer locking ring 104 rotates about the axis A to move the adjustment mechanism 100 between the locked state, preventing rotation of the adjustment knob 102, and the unlocked state, allowing rotation of the adjustment knob 102. For instance, the inner threaded locking ring 200 may move axially upward into the open end 103 of the adjustment knob 102 to move the adjustment mechanism 100 into the locked state when the outer locking ring 104 rotates in a first (locking) direction (e.g., one of clockwise or counterclockwise). Conversely, rotating the outer locking ring 104 in an opposite second (unlocking) direction (e.g., the other one of clockwise or counterclockwise) may cause the inner threaded locking ring 200 to move axially downward and away from the open end 103 of the adjustment knob 102 to move the adjustment mechanism 100 into the unlocked state. The bidirectional arrow in FIG. 3 denotes the upward and downward axial movement by inner threaded locking ring 200 when the outer locking ring 104 is rotated.

The inner threaded locking ring 200 defines an axial slot 204 configured to guide the axial movement of the inner threaded locking ring 200, while simultaneously preventing rotational movement of the inner threaded locking ring 200 when the outer locking ring 104 rotates. In some implementations, a rotational stop 206 (e.g., a pin or screw) fixedly attached to the turret base 106 extends radially outward from the narrow section 150*n* of the outer wall 150 and into the axial slot 204 defined by the inner threaded locking ring 200. Here, the rotational stop 206 received by the axial slot 204 prevents the inner threaded locking ring 200 from rotating in unison with the outer locking ring 104, and instead causes the threaded portion 205 of the inner threaded locking ring 200 to traverse along the internal threads 105 of the outer locking ring 104 when the outer locking ring 104 is rotated.

In some examples, an aperture 208 is formed into the narrow section 150*n* of the outer wall 150 and adapted to receive the rotational stop 206. For instance, when the rotational stop 206 includes a screw, the rotational stop 206 may threadably secure into the aperture 208. Alternatively, an interference fit between the aperture 208 and the rotational stop 206 may fixedly attach the stop 206 to the turret base 106. In other examples, the rotational stop 206 may be integrally formed with the turret base 106. For instance, the rotational stop 206 may include a radial protrusion along the narrow section 150*n* of the turret base 106.

In some implementations, the inner threaded locking ring 200 includes at least one tooth 210 adapted to engage at least one tooth 212 of the adjustment knob 102 when the inner threaded locking ring 200 moves axially upward and into the open end 103 of the adjustment knob 102. The engagement between the teeth 210, 212 moves the adjustment mechanism 100 into the locked state to prevent rotational movement of the adjustment knob 102. In the locked state, the inner threaded locking ring 200 is threadably coupled to the outer locking ring 104 and fixedly engaged with the adjustment knob 102. Accordingly, any attempt to rotate the adjustment knob 102 is prevented by the rotational stop 206 inhibiting the rotation of the inner threaded locking ring 200.

Figure 4:
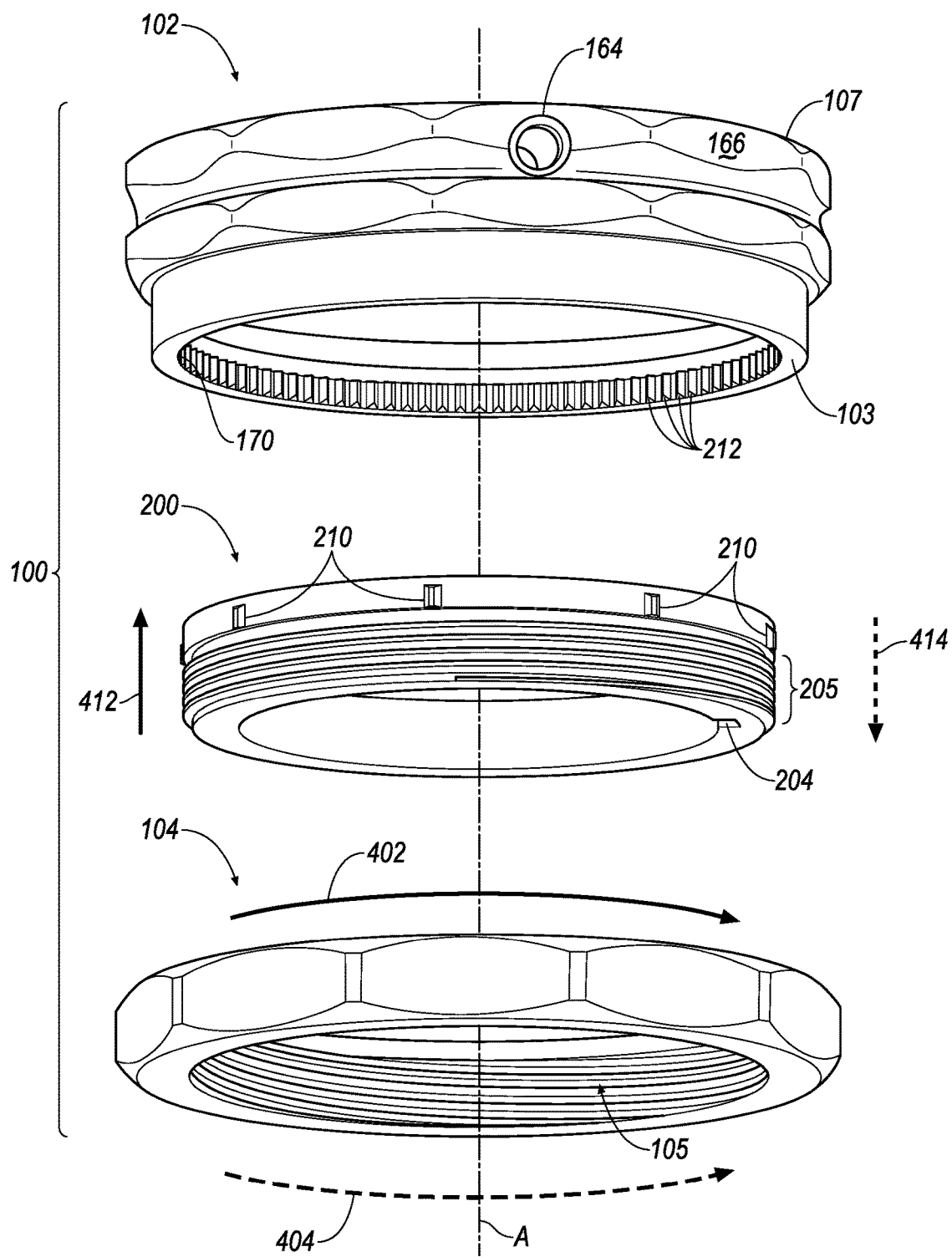
FIG. 4 is an exploded view an adjustment knob, an inner threaded locking ring, and an outer locking ring of the adjustment mechanism of FIGS. 2A and 2B.

FIG. 4 provides an exploded view of the adjustment mechanism 100 of FIGS. 1-3 including the adjustment knob 102, the inner threaded locking ring 200, and the outer locking ring 104 coaxial with the axis A and with one another. In the example shown, the turret base 106, turret adjustment base 120, and other components associated therewith are omitted for clarity.

The adjustment knob 102 defines a sidewall 166 axially extending between the open end 103 and a closed end 107 and includes one or more apertures 164 formed through the sidewall 166. Each aperture 166 is configured to receive a corresponding set screw 121 and screw cap 123. In some examples, three apertures 166 are formed through the sidewall 166 and circumferentially spaced apart from one another by about 120-degrees) (120°). In the example shown, the adjustment knob 102 includes a plurality of teeth 212 formed on an inner peripheral edge 170 of the sidewall 166. The teeth 212 protrude radially inward from the inner peripheral edge 170 and circumferentially extend around the inner peripheral edge 170 at a location adjacent to the open end 103 of the adjustment knob 102. In some implementations, each pair of adjacent teeth 212 defines a slot configured to receive a corresponding tooth 210 of the inner threaded locking ring 200.

In other configurations, a locking teeth ring may fixedly couple to the inner peripheral edge 170 of the sidewall 166 at a location adjacent to the open end 103 of the adjustment knob 102. Here, the threaded locking ring may define an inner diameter and include the plurality of teeth 212 formed in the inner diameter. Accordingly, the locking teeth ring may be incorporated in lieu of integrally forming the teeth 212 on the inner peripheral edge 170 of the sidewall 166.

In some implementations, an outer periphery of the inner threaded locking ring 200 includes the threaded outer portion 205 and a plurality of teeth 210 formed thereon, while an inner periphery of the inner threaded locking ring 200 defines the axial slot 204. The threaded outer portion 205 is adapted to threadably mate with the corresponding inner threads 105 of the outer locking ring 104 to threadably couple the inner threaded locking ring 200 to the outer locking ring 104. Rotation by the outer locking ring 104 about the axis A causes the inner threaded locking ring 200 to move axially due to the threaded outer portion 205 threadably traversing the corresponding inner threads 105 of the rotating outer locking ring 104. The axial slot 204 receives the rotational stop 206 for guiding the axial movement of the inner threaded locking ring 200 but preventing rotational movement of the inner threaded locking ring 200.

In the example shown, a user may grasp and rotate the outer locking ring 104 in a locking direction 402 about the axis A to cause the inner threaded locking ring 200 to move axially in a corresponding locking, upward direction 412 toward the adjustment knob 102. The inner threaded locking ring 200 may extend into the open end 103 of the adjustment knob 102 until the teeth 210 formed on the outer periphery engage with the teeth 212 of the adjustment knob 102. The teeth 210 of the inner threaded locking ring 200 may be circumferentially spaced around the outer periphery, and each tooth 210 may protrude radially outward. In some examples, each tooth 210 is received by a corresponding slot defined by an adjacent pair of teeth 212 formed on the inner peripheral edge 170 of the adjustment knob 102. The surfaces the teeth 212 of the adjustment knob 102 may be angled to guide corresponding teeth 210 of the inner threaded locking ring 200 into engagement as the inner threaded locking ring 200 axially moves in the locking, upward direction 412. When the teeth 210, 212 are engaged, the adjustment mechanism 100 is in the locked state to thereby prevent unintended movement by the adjustment knob 102 and, thus, prevent unintended adjustments to the setting of the reticle 300. More specifically, the locked state of the adjustment mechanism 100 prevents unintended movement by the turret adjustment base 120 to thereby prevent axial movement by the turret adjustment screw 114.

On the other hand, rotating the outer locking ring 104 in an opposite loosening direction 404 (denoted by dashed arrow) about the axis A, causes the inner threaded locking ring 200 to move axially in a corresponding unlocking, downward direction 414 (denoted by dashed arrow) away from the adjustment knob 102. Movement in the downward direction 414 allows the teeth 210 of the inner threaded locking ring 200 to disengage from the teeth 212 formed on the inner peripheral edge 170 of the adjustment knob 102. When the teeth 210, 212 are disengaged, the adjustment mechanism 100 is in the unlocked state to thereby allow rotational movement by the adjustment knob 102 for adjusting the setting of the reticle 300.

Figure 5:
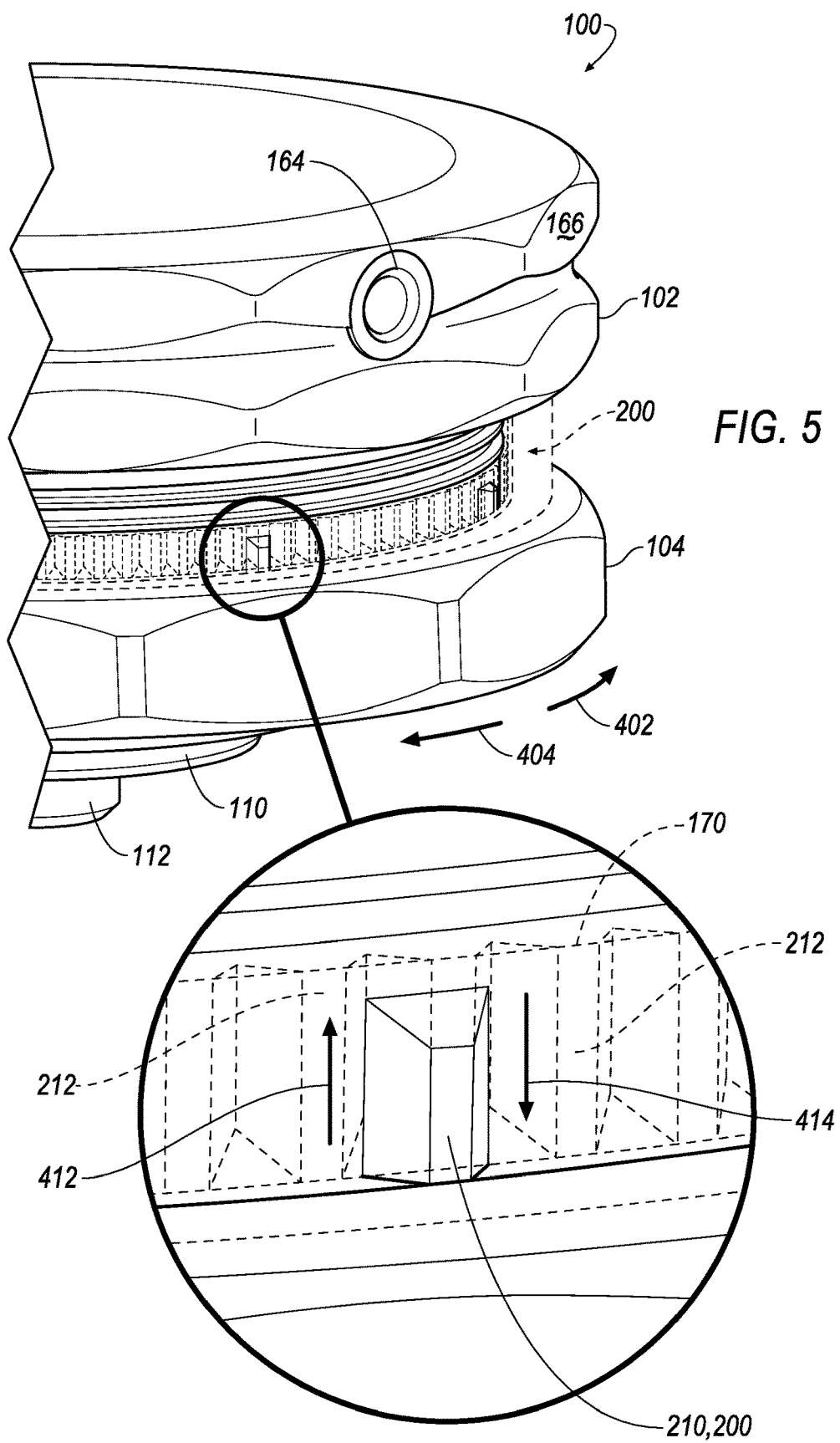
FIG. 5 is a perspective view of the adjustment mechanism of FIGS. 2A and 2B showing at least one tooth of an inner threaded locking ring engaging at least one tooth of a teeth formed on an inner peripheral edge of an adjustment knob to prevent rotation by the adjustment knob.

FIG. 5 provides a partial perspective view of the adjustment mechanism 100 in the locked state when the at least one tooth 210 of the inner threaded locking ring 200 engages the at least one tooth 212 formed on the inner peripheral edge 170 of the adjustment knob 102. A detailed view within the circle shows the inner peripheral edge 170 and the radially inward protruding teeth 212 formed thereon as hidden, while for clarity, solid lines depict the radially outward protruding tooth 210 enclosed by the inner peripheral edge 170 of the adjustment knob 102. As set forth in detail above, rotating the outer locking ring 104 in the locking direction 402 axially moves the teeth 210 (e.g., in the locking, upward direction 412) of the inner threaded locking ring 200 into engagement with the teeth 212 of the adjustment knob 102 to prevent rotational movement by the adjustment knob 102. On the other hand, rotating the outer locking ring 104 in the opposite unlocking direction 404 axially moves the inner threaded locking ring 200 (e.g., in the unlocking, downward direction 414) to disengage the teeth 210 from the teeth 212 of the adjustment knob 102, and thereby allow rotational movement of the adjustment knob 102.

A number of implementations have been described. Nevertheless, it will be understood that various modifications may be made without departing from the spirit and scope of the disclosure. Accordingly, other implementations are within the scope of the following claims.

What is claimed is:

1. An apparatus for adjusting and locking a reticle of an optical device, the apparatus comprising:
   an adjustment knob having at least one tooth protruding radially inward from an inner peripheral edge of the adjustment knob;
   an inner threaded locking ring having at least one tooth and a threaded outer portion, the at least one tooth protruding radially outward from the inner threaded locking ring and configured to engage the at least one tooth of the adjustment knob to prevent unintended adjustments to the reticle by preventing unintended rotational movement of the adjustment knob; and
   an outer locking ring threadably coupled to the inner locking ring, the outer locking ring configured to:

move the inner threaded locking ring in a first axial direction toward the adjustment knob when the outer locking ring is rotated in a first rotatable direction; and move the inner threaded locking ring in an opposite second axial direction away from the adjustment knob when the outer locking ring is rotated in an opposite second rotatable direction, wherein the adjustment knob and the outer locking ring do not axially overlap when the at least one tooth of the inner threaded locking ring is engaged to the at least one tooth of the adjustment knob.

2. The apparatus of claim 1, wherein the at least one tooth of the adjustment knob includes a plurality of teeth formed from the inner peripheral edge and circumferentially extending around the inner peripheral edge of the adjustment knob.

3. The apparatus of claim 1, wherein the at least one tooth of the inner threaded locking ring axially moves into engagement with the at least one tooth of the adjustment knob when the inner threaded locking ring moves in the first axial direction.

4. The apparatus of claim 3, wherein the at least one tooth of the inner threaded locking ring is configured to disengage from the at least one tooth of the adjustable knob when the inner threaded locking ring axially moves in the second axial direction.

5. The apparatus of claim 1, wherein the inner threaded locking ring defines an axial slot configured to receive a pin to guide the axial movement of the inner threaded locking ring along the first and second axial directions.

6. The apparatus of claim 5, wherein the pin received by the axial slot is configured to prevent rotational movement by the inner threaded locking ring when the outer locking ring is rotated.

7. The apparatus of claim 1, further comprising a turret adjustment base enclosed within the adjustment knob, the turret adjustment base releasably coupled for common rotation with the adjustment knob.

8. The apparatus of claim 7, wherein the adjustment knob defines a sidewall axially extending between an open end and a closed end, the adjustment knob having one or more apertures formed through the sidewall, each aperture configured to receive a corresponding set screw for releasably coupling the turret adjustment base for common rotation with the adjustment knob.

9. The apparatus of claim 8, wherein the adjustment knob has at least three apertures formed through the sidewall.

10. The apparatus of claim 7, further comprising a turret base defining a threaded axial passage threadably engaged to a reticle adjustment screw, the reticle adjustment screw coupled for common rotation with the turret adjustment base, wherein the turret adjustment base is configured to rotate relative to the turret base to cause axial movement by the turret adjustment screw.

11. The apparatus of claim 10, further comprising a turret guide pin coupled for common rotation with the turret adjustment base, the turret guide pin biased into engagement with a ratcheted surface of the turret base that encloses the turret adjustment base.

12. An apparatus for adjusting and locking a reticle of an optical device, the apparatus comprising:
an adjustment knob having a plurality of teeth circumferentially extending around an inner peripheral edge of the adjustment knob;
an inner threaded locking ring having at least one tooth and a threaded outer portion, the at least one tooth protruding radially outward from the inner threaded locking ring and configured to selectively engage one or more of the teeth of the adjustment knob to prevent unintended adjustments to the reticle by preventing unintended rotational movement of the adjustment knob; and
an outer locking ring threadably coupled to the inner locking ring, the outer locking ring configured to axially move the at least one tooth of the inner threaded locking ring into engagement with the one or more teeth of the adjustment knob when rotated in a locking direction,
wherein the adjustment knob and the outer locking ring do not axially overlap when the at least one tooth of the inner threaded locking ring is engaged to the one or more teeth of the adjustment knob.

13. The apparatus of claim 12, wherein the outer locking ring is further configured to axially move the at least one tooth of the inner threaded locking ring out of engagement with the one or more teeth of the adjustment knob when rotated in an unlocking direction.

14. The apparatus of claim 12, wherein the outer locking ring is configured to:
move the inner threaded locking ring in a first axial direction toward the adjustment knob when the outer locking ring is rotated in the locking direction; and
move the inner threaded locking ring in an opposite second axial direction away from the adjustment knob when the outer locking ring is rotated in an unlocking direction.

15. The apparatus of claim 14, wherein the inner threaded locking ring defines an axial slot configured to receive a pin to guide the axial movement of the inner threaded locking ring along the first and second axial directions but prevent rotational movement of the inner threaded locking ring.

16. A method comprising:
threadably coupling an outer locking ring to an inner locking ring, the inner locking ring having at least one tooth and a threaded outer portion;
rotating the outer locking ring in a first rotatable direction to move the inner threaded locking ring in a first axial direction toward an adjustment knob, the adjustment knob having an inner peripheral edge and at least one tooth formed on the inner peripheral edge, the at least one tooth formed on the inner peripheral edge configured to engage the at least one tooth of the inner locking ring when the outer locking ring rotates in the first rotatable direction; and
rotating the outer locking ring in a second rotatable direction to move the inner threaded locking ring in an opposite second axial direction away from the adjustment knob,
wherein unintended rotational movement by the adjustment knob is prevented when the at least one tooth of the inner locking ring engages the at least one tooth formed on the inner peripheral edge of the adjustment knob, and
wherein the adjustment knob and the outer locking ring do not axially overlap when the at least one tooth of the inner locking ring is engaged to the at least one tooth of the adjustment knob.

17. The method of claim 16, wherein the at least one tooth of the adjustment knob protrudes radially inward from the inner peripheral edge of the adjustment knob, and wherein the at least one tooth of the inner locking ring protrudes radially outward from the inner threaded locking ring.

18. The method of claim 16, wherein the axial movement by the inner threaded locking ring in the second axial direction disengage the at least one tooth of the inner locking ring from the at least one tooth formed on the inner peripheral edge.

19. The method of claim 18, wherein rotational movement by the adjustment knob is allowed when the at least one tooth of the inner locking ring and the at least one tooth formed on the inner peripheral edge of the adjustment knob are disengaged.

* * * * *